Feb. 17, 1925.
C. C. FARMER
FLUID PRESSURE BRAKE
Original Filed June 23, 1923
1,526,779
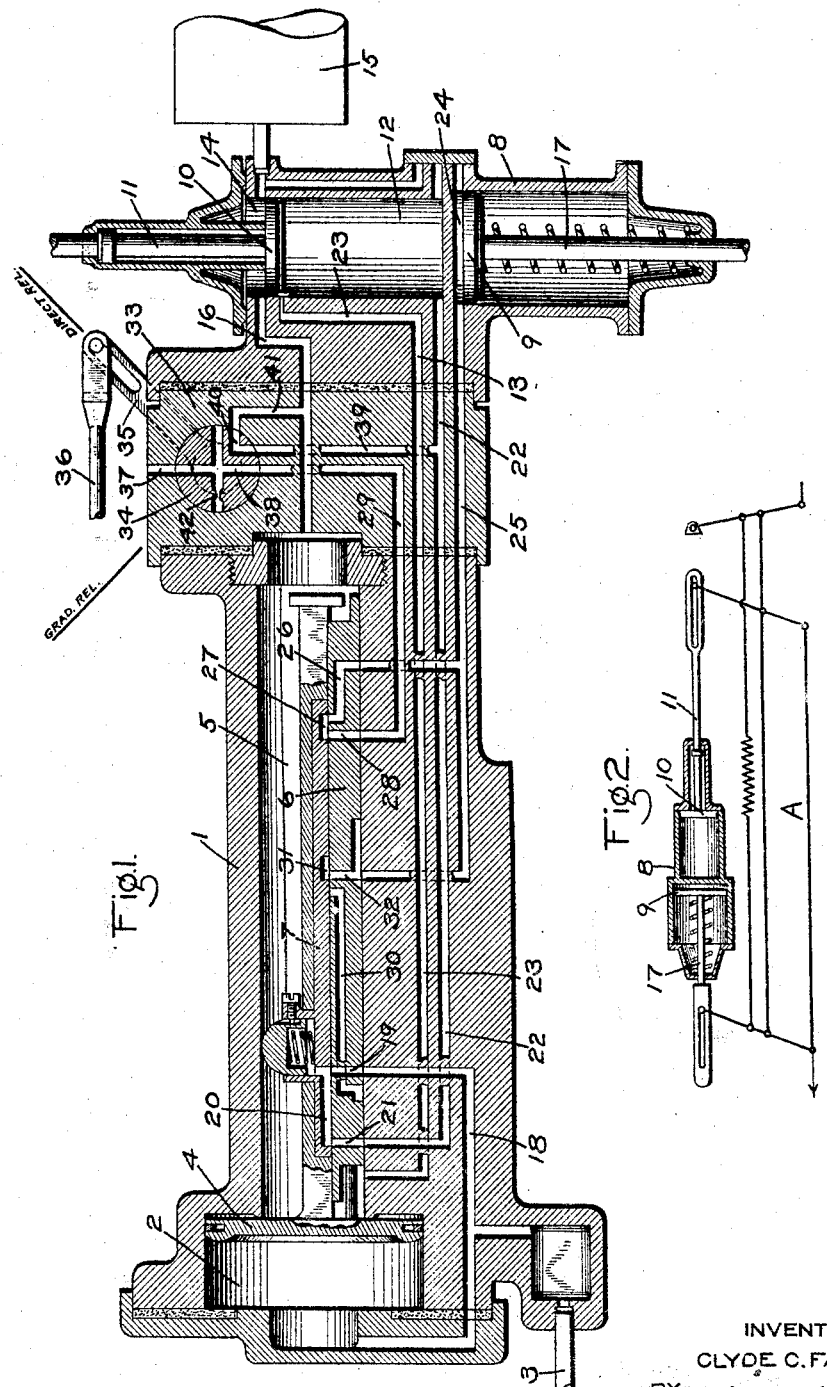
INVENTOR
CLYDE C. FARMER
BY *Wm. M. Cady*
ATTORNEY Patented Feb. 17, 1925.

1,526,779

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed June 28, 1923, Serial No. 648,272. Renewed July 24, 1924.

*To all whom it may concern:*

Be it known that I, CLYDE C. FARMER, a citizen of the United States, residing at Pittsburgh, in the county of Allegheny and State of Pennsylvania, have invented new and useful Improvements in Fluid-Pressure Brakes, of which the following is a specification.

This invention relates to fluid pressure brakes, and more particularly to a triple valve device for an automatic fluid pressure brake system.

The principal object of my invention is to provide means for cutting out the graduated release feature of a certain type of graduated release triple valve device hereinafter described.

In the accompanying drawing; Fig. 1 is a sectional view of a graduated release triple valve device, showing my invention applied thereto; and Fig. 2 a diagram illustrating the manner in which the triple valve device is associated with the brake rigging.

Before describing my invention, I will first describe the graduated release triple valve device for which my invention is designed.

As shown in Fig. 1, the triple valve device may comprise a casing 1, having a piston chamber 2, connected to the usual automatic brake pipe 3 and containing piston 4, and having a valve chamber 5 containing a main slide valve 6, and a graduating slide valve 7 adapted to be operated by piston 4.

Associated with casing 1 is a casing 8 which includes a brake cylinder containing a brake cylinder piston 9. The casing 8 also includes a cylinder containing a loading piston 10 which is connected by piston rod 11 to the brake rigging and having the chamber 12 at one side of the piston connected to a passage 13, leading to the seat of slide valve 6. The chamber 14 at the opposite side of piston 10 is connected to a fluid pressure storage reservoir 15 and by passage 16 to the valve chamber 5.

The brake cylinder piston 9 is connected by a slotted piston rod 17 to the brake rigging A, as shown in Fig. 2, so that the brakes will be applied upon outward movement of the piston 9. The piston rod 11 is also connected to the brake rigging A, so that inward movement of the piston 10 will also apply the brakes.

In operation of the above described triple valve device, when fluid under pressure is supplied to the brake pipe 3, the piston chamber 2 is charged with fluid under pressure, causing movement of the piston 4 to full release position, as shown in Fig. 1. Fluid is then supplied to piston chamber 12 through passage 18, port 19 in slide valve 6, cavity 20 in slide valve 7, port 21 in slide valve 6, and passage 22.

The increase in pressure in chamber 12, assisted by the fact that the area of the piston rod 11 is subject to atmospheric pressure causes the piston 10 to be moved to its full release position, as shown in Fig. 1, in which passage 23 is uncovered, so that fluid under pressure will be supplied from chamber 12 through passage 23 to valve chamber 5. Fluid then flows from valve chamber 5, through passage 16 to piston chamber 14 and to the reservoir 15, charging same to the pressure carried in the system.

With slide valve 6 in full release position, the piston chamber 24 of piston 9 is connected to the atmosphere through passage 25, port 26 in main slide valve 6, cavity 27 in the graduating slide valve 7, port 28 in slide valve 6 and passage 29.

If it is desired to effect a service application of the brakes, the brake pipe pressure is gradually reduced and the pressure in piston chamber 2 is thereupon reduced, so that the higher pressure in valve chamber 5 operates to shift piston 4 to its extreme left hand position.

The initial movement of piston 4 operates the graduating slide valve 7 to close the exhaust from the brake cylinder piston chamber 24 through passage 25 and also to close communication from the brake pipe to the piston chamber 12.

The main slide valve 6 is then moved to a position in which fluid under pressure is supplied from chamber 12 to brake cylinder piston chamber 24 through passage 22, port 30 in main slide valve 6, cavity 31 in slide valve 7, port 32 in slide valve 6, and passage 25. Fluid under pressure thus supplied to piston chamber 24 forces the brake cylinder piston 9 outwardly so as to apply the brakes.

As the pressure in chamber 12 decreases by flow to piston chamber 24, the piston 10 is moved downwardly by the higher pressure in chamber 14 and since the volume open to the valve chamber 5 and the reservoir 15 is increased by the increase in volume of chamber 14 due to the downward movement of piston 10, the pressure in valve chamber 5 and reservoir 15 will be decreased until the pressure becomes slightly less than the reduced brake pipe pressure acting in piston chamber 2, when the piston 4 will be moved toward the right, shifting the graduating valve 7 so as to cut off communication through which fluid is supplied from the chamber 12 to the brake cylinder piston chamber 24.

As my invention involves the release operation of the triple valve device, I will now describe same before proceeding with the description of the operation in releasing the brakes.

According to my improvement, a filling piece 33 may be interposed between the casing 1 and the casing 8 and in said filling piece is provided a rotatable cock 34 operable by means of a lever 35 and a rod 36. The cock 34 has two positions, a direct release position, as shown in Fig. 1, in which the brake cylinder exhaust port 29 is connected to an atmospheric exhaust port 37 through an unrestricted port 38 and in which chamber 12 is connected to chamber 14 and reservoir 15 through passage 22, passage 39, cavity 40 in cock 34, passage 41, and passage 16. The other operating position of cock 34 is the graduated release position, in which brake cylinder exhaust passage 29 is connected to atmospheric exhaust port 37 through a restricted port 42 in the cock 34.

If the cock 34 is turned to its graduated release position, the triple valve operates as hereinbefore described and in releasing the brakes, if it is desired to graduate the release of the brakes, the brake pipe pressure is gradually increased above the pressure in valve chamber 5. The piston 4 is then shifted to release position, as shown in Fig. 1, and fluid will be released from the brake cylinder piston chamber 24 through passage 25, port 26, cavity 27 in slide valve 7, port 28, passage 29, restricted port 42 in cock 34, and exhaust port 37.

In release position of the triple valve parts, fluid under pressure is supplied from brake pipe 3 to piston chamber 12, as hereinbefore described, and the increase in pressure thus produced in chamber 12 causes an upper movement of piston 10. The volume of chamber 14 is thus reduced and consequently the pressure in valve chamber 5 and reservoir 15 is increased until the pressure in valve chamber 5 is slightly higher than the brake pipe pressure in piston chamber 2, when piston 4 will be shifted toward the left to graduated release lap position, in which the brake pipe is cut off from chamber 12 and communication from brake cylinder piston chamber to the atmosphere is closed. It will be evident that the pressure in the brake cylinder may be reduced by further graduated amounts by making further gradual increases in brake pipe pressure until the pressure in the brake cylinder has been fully released.

With the above described graduated release construction, it is necessary to restrict the exhaust from the brake cylinder as restricted at the port 42 in cock 34 in order to prevent the brake cylinder pressure from reducing too much before the piston 14 has had time to move upwardly so as to increase the pressure in valve chamber 5, since it is necessary to increase the pressure in valve chamber 5 in order to effect the movement of the triple valve parts to graduated release lap position.

While the restriction of the exhaust from the brake cylinder assists the graduated release operation of the triple valve device, it would be objectionable when a direct prompt release of the brakes may be desired, as where the train is operating upon long level stretches of road, under which conditions, graduated release in itself is detrimental, as it tends to delay operation of the train.

In order to cut out the graduated release feature when desired, the cock 34 may be turned to its direct release position, in which, since the release of fluid from the brake cylinder is by way of an unrestricted port 38 in cock 34 and since the chamber 12 is connected to chamber 14 through cavity 40 in cock 34, the triple valve device will operate as an ordinary triple valve device of the usual type, the chambers 12 and 14 and the reservoir 15 acting as the usual auxiliary reservoir connected to valve chamber 5 and from which fluid is supplied to the brake cylinder piston chamber 24 when the triple valve piston 4 is operated by a reduction in brake pipe pressure.

In other words, when the cock 34 is in its graduated release position, the triple valve acts as a graduated release triple valve device, as originally intended, while if the cock is in its direct release position, the triple valve device is practically converted into an ordinary triple valve device of the usual type, so far as its operation is concerned.

Having now described my invention, what I claim as new and desire to secure by Letters Patent, is:—

1. In a fluid pressure brake, the combination with a brake pipe, a brake cylinder, a supply chamber, a piston subject to the opposing pressures of the brake pipe and a valve chamber, valve means operated by said piston upon a reduction in brake pipe pressure for supplying fluid from said supply chamber to the brake cylinder and upon an increase in brake pipe pressure for releasing fluid from the brake cylinder, and a movable piston subject to the opposing pressures of said valve chamber and said supply chamber, of a valve for controlling communication through which fluid is released from the brake cylinder and having one position in which said communication is restricted and another position in which said communication is unrestricted.

2. In a fluid pressure brake, the combination with a brake pipe, a brake cylinder, a supply chamber, a piston subject to the opposing pressures of the brake pipe and a valve chamber, valve means operated by said piston upon a reduction in brake pipe pressure for supplying fluid from said supply chamber to the brake cylinder and upon an increase in brake pipe pressure for releasing fluid from the brake cylinder, and a movable piston subject to the opposing pressures of said valve chamber and said supply chamber, of a valve for controlling communication through which fluid is released from the brake cylinder and having one position in which said communication is restricted and another position in which said communication is unrestricted and in which said valve chamber is connected to said supply chamber.

3. In a fluid pressure brake, the combination with a brake pipe, a brake cylinder, a chamber, a reservoir, a triple valve device subject to the opposing pressures of the brake pipe and said reservoir and operated upon a reduction in brake pipe pressure for supplying fluid from said chamber to said brake cylinder and upon an increase in brake pipe pressure for releasing fluid from the brake cylinder, and a movable piston operable according to the opposing pressures of the reservoir and said chamber, of a valve having a position in which the exhaust from the brake cylinder is restricted and another position in which the exhaust is unrestricted and in which said reservoir is connected to said chamber.

In testimony whereof I have hereunto set my hand.

CLYDE C. FARMER.